US005252992A

United States Patent [19]

Fukushima et al.

[11] Patent Number: 5,252,992

[45] Date of Patent: Oct. 12, 1993

[54] INK JET RECORDING APPARATUS

[75] Inventors: Hisashi Fukushima; Nobuhiko Takekoshi; Akio Suzuki, all of Yokohama, Japan

[73] Assignee: Canon Kaubushiki Kaisha, Tokyo, Japan

[21] Appl. No.: 649,259

[22] Filed: Jan. 31, 1991

Related U.S. Application Data

[63] Continuation of Ser. No. 498,959, Mar. 26, 1990, abandoned.

[30] Foreign Application Priority Data

Mar. 29, 1989 [JP] Japan .................................. 1-74916

[51] Int. Cl.[5] .......................... B41J 2/21; H04N 1/46

[52] U.S. Cl. ................................. 346/140 R; 346/46; 358/518; 358/298

[58] Field of Search ...................... 346/140 R, 1.1, 75, 346/46; 358/75, 77, 80, 296, 298

[56] References Cited

U.S. PATENT DOCUMENTS

| | | | |
|---|---|---|---|
| 3,926,117 | 12/1975 | Milligan | 101/211 |
| 4,178,597 | 12/1979 | Isayama et al. | 346/75 |
| 4,415,920 | 11/1983 | Kato et al. | 358/37 |
| 4,561,025 | 12/1985 | Tsuzuki | 358/298 |
| 4,595,948 | 6/1986 | Itoh et al. | 358/75 |
| 4,631,578 | 12/1986 | Sasaki et al. | 358/80 |
| 4,635,078 | 1/1987 | Sakurada et al. | 346/140 R |
| 4,644,392 | 2/1987 | Yamada | 358/75 |
| 4,686,538 | 8/1987 | Kouzato | 346/1.1 |
| 4,700,399 | 10/1987 | Yoshida | 358/80 X |
| 4,727,436 | 2/1988 | Kawamura et al. | 346/140 R |
| 4,737,860 | 4/1988 | Ono et al. | 358/298 |
| 4,905,023 | 2/1990 | Suzuki | 358/298 X |
| 4,975,768 | 12/1990 | Takaraga | 358/75 |

FOREIGN PATENT DOCUMENTS

| | | |
|---|---|---|
| 61-290060 | 12/1986 | Japan . |
| 0041377 | 2/1989 | Japan . |
| 0252069 | 10/1989 | Japan . |

OTHER PUBLICATIONS

"Overpaint Function for Color Printer", IBM Technical Disclosure Bulletin, vol. 29, No. 9, Feb. 1987.

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

An ink jet recording apparatus wherein an image is formed on a recording material by ejection of coloring agents having different colors from plural recording heads. The apparatus includes a discriminator for discriminating whether an image having a edge and an image having high image density are to be overlaid or not; and a controller, responsive to the discriminator, for exchanging a primary coloring agent with a secondary coloring agent at a position corresponding to at least one of the edge image and a periphery of the edge image.

3 Claims, 12 Drawing Sheets

INK JET RECORDING APPARATUS

This application is a continuation of application Ser. No. 07/498,959 filed Mar. 26, 1990, now abandoned.

FIELD OF THE INVENTION AND RELATED ART

The present invention relates to an ink jet recording apparatus having a plurality of recording heads.

An ink jet recording apparatus for recording images is known wherein ink or another coloring agent is ejected on a recording material to form the images. The ink jet recording apparatus is becoming widely used because of the advantages that the noise is small because it is of the non-impact type and that color image recording is easy using various color inks and other advantages.

Referring first to FIG. 14, there is shown a conventional ink jet recording apparatus in a perspective view. The ink jet recording apparatus comprises a recording material 5 in the form of a roll, recording material conveying rollers 1 and 2, a feeding roller 3 which is driven by a sub-scanning motor 50 to be fed in a direction indicated by an arrow f. Across the recording material 5, guide rails 6 and 7 are extended in parallel on which a recording head unit 9 is carried on a carriage for main-scanning movement. The carriage 8 has four color recording heads 9Y, 9M, 9C, 9BK for yellow, magenta, cyan and black colors. They are connected for the four color ink containers, respectively. The recording material 5 is intermittently fed by the amount corresponding to the printing width of the recording head 9. When the recording material 5 is not moved, the recording head 9 moves in the direction indicated by an arrow P, and ink droplets are ejected in accordance with the image signal. The conventional apparatus involves a problem, that is, in the case where after a solid image is printed in one color, a line image such as a character is printed thereon in a different color before the first ink dries, edges of the line image are blurred. FIGS. 12A and 12B schematically show the overlapping of the ink layers at the instance when the second line image is printed before the first color image is not dried. FIG. 12A is a top plan view, and FIG. 12B is a sectional view taken along a chain line of FIG. 12A.

From the state shown in FIGS. 12A and 12B, both of the first color ink and the second color ink are evaporated and absorbed into the recording sheet. FIGS. 13A and 13B show schematically the state wherein the first color and the second color are mixed. That is, before the first ink is dried, the second ink is overlaid thereon, and therefore, as shown in FIG. 13B, the second ink flows outside, so that the edges of the line is blurred by the mixture of the first color and the second color, as shown in FIG. 13A.

In addition, in the case where the sheet feeding speed is increased in an attempt to increase the throughput, there occurs a possibility that the second color ink is ejected before the first ink is dried. The same image blurring occurs in this case, too.

SUMMARY OF THE INVENTION

Accordingly, it is a principal object of the present invention to provide an improved ink jet recording apparatus.

It is another object of the present invention to provide an ink jet recording apparatus wherein even when coloring agents having different colors are overlaid, unnecessary color mixture is prevented to provide a sharp and clear image.

It is a further object of the present invention to provide an ink jet recording apparatus wherein an image having an edge and a high density image are overlaid, the quantity of the coloring agent for the high density image is increased at the position or positions corresponding to the edge or periphery of the edge, by which the edge blur of the line image by the color mixture is prevented.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

The preferred embodiments of the present invention will be described in conjunction with the accompanying drawings.

Embodiment 1

Figure 1:
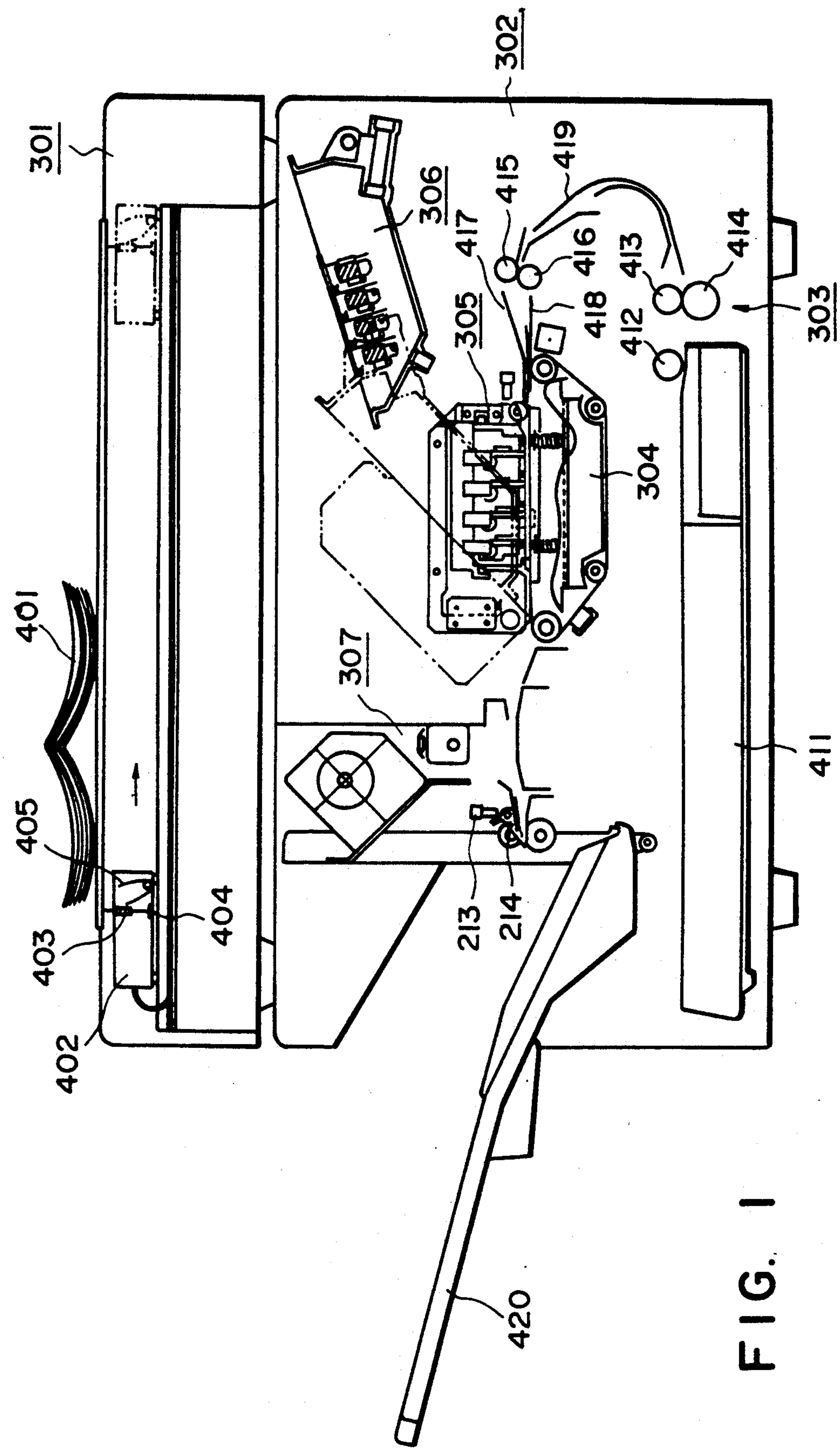
FIG. 1 shows a general arrangement of an ink jet recording apparatus according to an embodiment of the present invention.

FIG. 1 is a sectional view of an ink jet recording apparatus according to an embodiment of the present invention. The general arrangement will first be described. The apparatus comprises a scanner 301 for reading an original and converting the outputs thereof to electric signals. The output of the scanner is supplied as a driving signal to a recording head 305 of a printer 302. A sheet feeder 303 accommodates recording sheets (recording material) and is effective to feed the recording sheets one-by-one to a belt conveyer 304. On the recording sheet is imparted the recorded image by the recording head 305 while it is conveyed by the belt conveyer 304. It is discharged to a tray 420 through an image fixing and discharging station 307.

The apparatus further comprises a recovery gap 306 to maintain the recording head 305 in a printable state.

In the scanner 301, an original 401 is scanned by an original scanning unit 402. The original scanning unit 402 contains a unit magnification color separation line sensor (color image sensor) 404, a rod array lens 403 and an exposure lamp 405. Simultaneously with the original scanning unit 402 starting its scanning movement in the direction of the arrow to read an image of the original 401 on an original supporting platen, an exposure lamp 405 in the original scanning unit 402 is turned on, by which the light reflected by the original 401 is guided by the rod array lens 403 to be concentrated on the unit magnification color separation line sensor which is a color image reading sensor. The color image information on the original is read for each of the color components, and the read is converted to electric digital signals. The digital signal is transmitted to an unshown image discriminator, where the discrimination is made as to whether the region of the image is a character portion having edges, solid high density portion or another portion.

Then, the processing which will be described hereinafter is performed, and the signals are supplied to the printer 302 which produces ejection printing signals of the recording head for the respective colors.

The description will be made as to the ejection principle of the ink jet recording apparatus in this embodiment. The recording head used in the ink jet recording apparatus includes fine liquid ejection outlets (orifices), liquid passages, energy applying portions disposed on a part of liquid passages, and energy generating means for generating liquid droplet forming energy to the liquid at the energy applying portion.

As for the energy generating means for generating such energy, there are electromechanical transducers such as a piezoelectric element, a liquid produce heat, by which the liquid droplet is ejected, and an electrothermal transducer for heating the liquid to eject it.

Among them, the recording head using the thermal energy is advantageous in that the liquid outlets (orifices) for ejecting liquid droplets can be disposed at a high density, and therefore, high resolution recording is possible. A recording head using the electrothermal transducers as the energy generating means can be reduced in its size, and in addition, the advantages of IC technique or microprocessing technique which has recently been remarkably improved in the semiconductor manufacturing field can be used to a great extent. Furthermore, it can be easily produced in the form of an elongated head or a two dimensional head. Therefore, it is easy to produce it in a multi-nozzle-high density head. In addition, it can be mass-produced at low manufacturing cost. The ink jet recording head using the electrothermal transducer as the energy generating means and produced through a semiconductor manufacturing process, generally has liquid passages corresponding to the respective orifices, wherein the thermal energy is applied to the liquid filling the liquid passages by the electrothermal transducers to eject the liquid through the orifice. A common chamber is provided to supply the liquid to the respective liquid passages.

Figure 9:
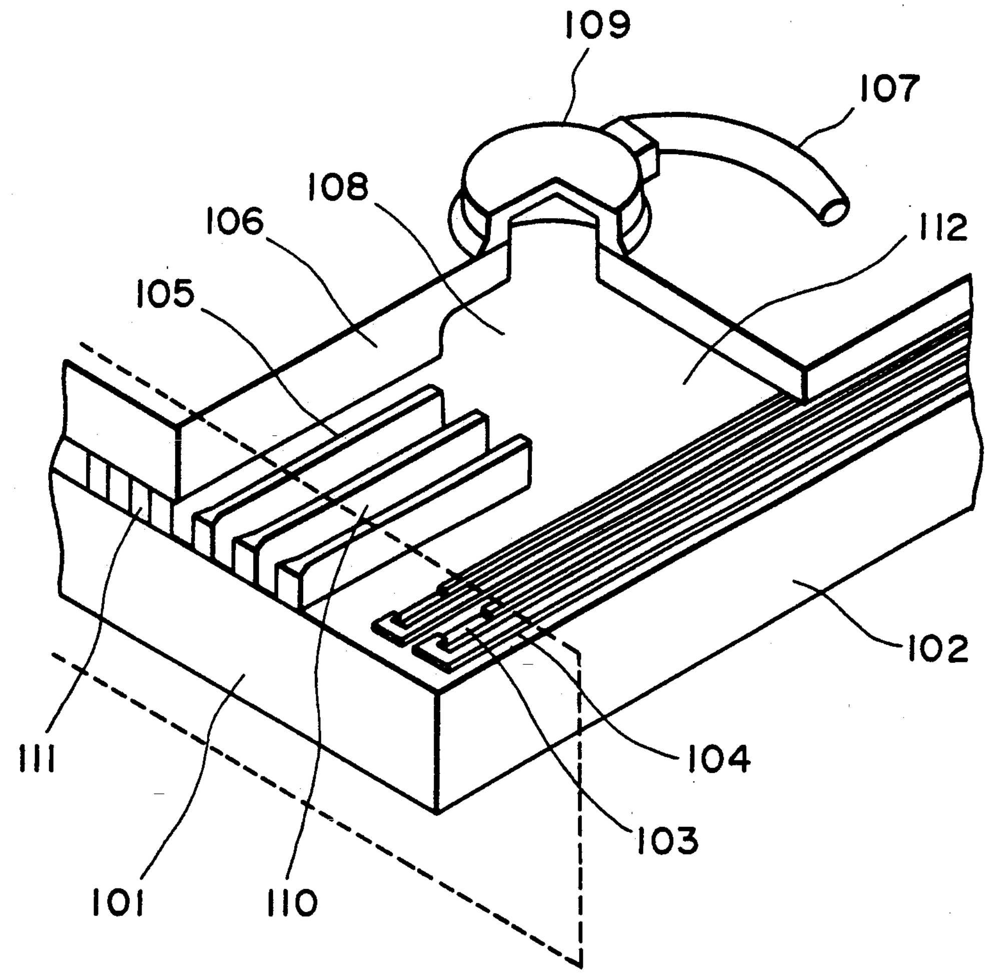
FIG. 9 is a perspective view showing details of the recording head according to an embodiment of the present invention.

FIG. 9 shows a general arrangement of the ink jet recording head which comprises an electrothermal transducer 103 formed as a film on a substrate 102 through a semiconductor manufacturing process including an etching step, an evaporation step or a sputtering step, electrodes 104, nozzle walls 105 and a top plate 106. Recording liquid 112 is supplied into a common chamber 108 of the recording head 101 from an unshown liquid container through a liquid supply pipe 107. Designated by a reference 109 is a connector for supplying the liquid.

The liquid 112 supplied into the common chamber 108 is supplied into the nozzle 110 by capillary action, and is retained there by formation of a meniscus at the orifice of the nozzle end. By supplying electric power to the electrothermal transducer 103, the liquid on the electrothermal transducer is heated, by which a bubble is produced. By the bubble formation energy, a liquid droplet is ejected through the orifice 111. By the structures described above, a multi-nozzle ink jet recording head having a high density such as 16 nozzles/mm can be produced.

Figure 8:
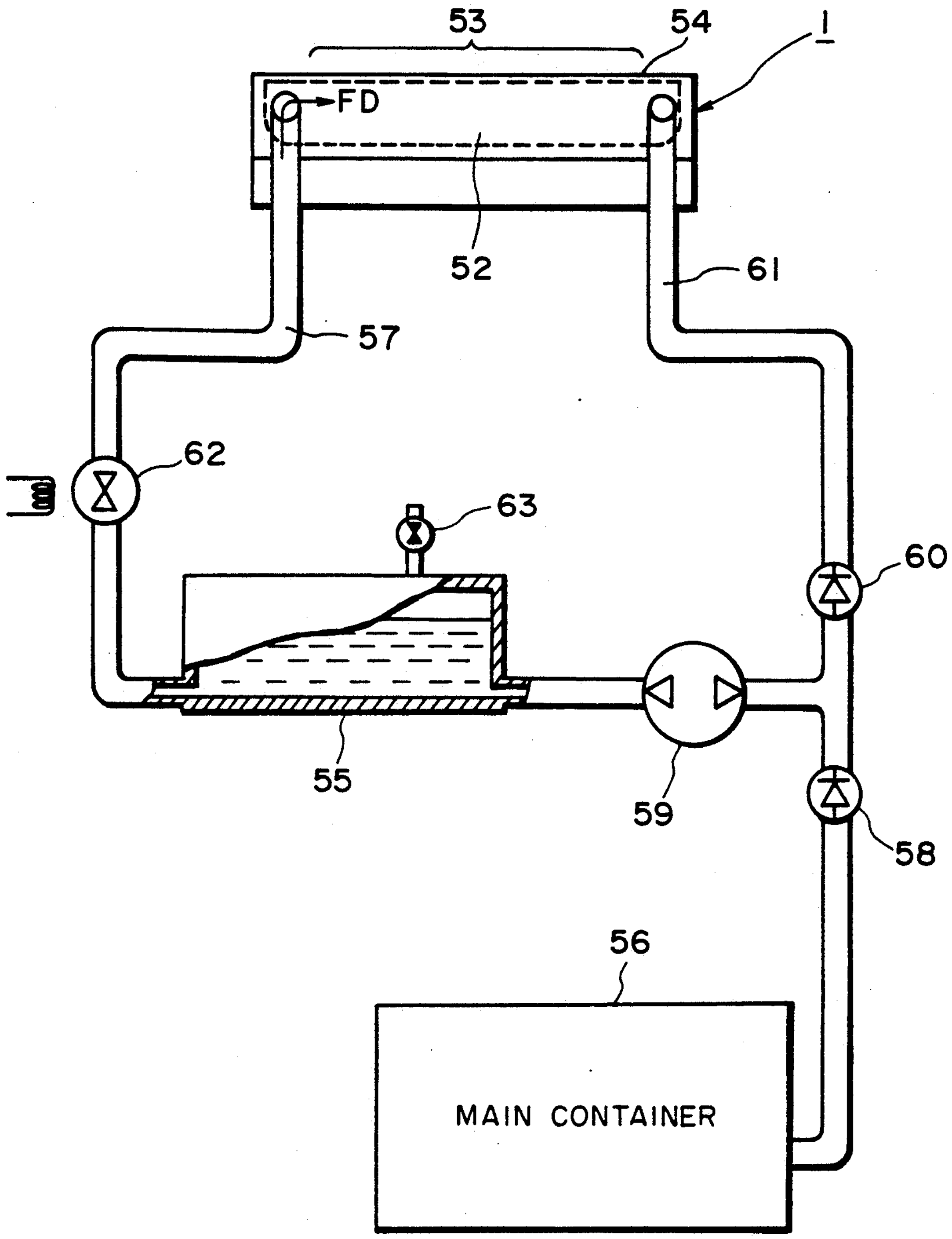
FIG. 8 shows an ink supply system of an ink jet recording apparatus according to an embodiment of the present invention.

FIG. 8 shows the structures of an elongated recording head having multi-nozzles and an ink supply means. The recording head 1 comprises a common chamber 52 and liquid ejection outlets (orifices) 53 arranged in the recording liquid ejection surface 54. In this embodiment, the number of the ejection outlets 53 is enough to cover the width of the recording material. By selectively driving the heat generating elements on unshown liquid passages communicating with the respective outlets 53, the recording liquid is ejected, so that the recording operation can be carried out without head movement in the main-scanning direction.

The ink supply system includes a recording liquid supply container for supplying the recording liquid to the recording head 1, a main container 56 for supplying the recording liquid to the container 55, wherein the recording liquid is supplied from the container 55 through the supply pipe 57 to the common chamber 52 of the recording head. When the recording liquid is to be replenished, the recording liquid can be supplied into the supply container 5 from a main container 56 through a one-way replenishing valve 58 by a recovery pump 59.

The system further comprises a one-way valve 60 used for a recovery operation for recovering the function of the recording head 1, a circulation pipe 61 in which the recovery valve 60 is mounted, an electromagnetic valve 62 in the first supply pipe 57 described above, and an air vent valve 63 for the supply container.

In the recording head 1, the recording liquid supply system and the recovery system, the electromagnetic valve 62 is opened during the recording operation, so that the recording liquid is supplied into the common chamber 52 by the weight of the liquid from the supply tank 55, and is fed to the orifice 53 from the chamber 52 through an unshown liquid passage.

During the recovery operation wherein air bubble or bubbles stagnating in the common chamber 52 or the liquid supply system is removed, or the recording head is cooled, the recovery pump 59 is operated to supply the recording liquid into the common chamber 52 through the circulation pipe 61, by which the recording liquid is supplied from the common chamber 52 through the first supply pipe 57 back to the supply container 55, thus circulating the liquid.

At the initial liquid supply operation, the electromagnetic valve 62 is closed, and the recording liquid is forcedly supplied into the common chamber 52 through the circulation pipe 61 by the pump 59, by which the air bubble or bubbles are discharged, and the recording liquid is discharged through the orifice 53.

The recording sheet used as the recording material is closely contacted and retained on the conveyer belt 61 electrically charged by a corona discharging means 606, and is conveyed by the rotation of the driving roller 602. The gap between the ejecting surface and the recording sheet is maintained by contact of pins 616. In this state, when the recording sheet passes below the recording head 110C, 110M, 110Y and 110BK, the printing operation in the respective colors are performed, so that the cyan image, magenta image, yellow image and the black image are printed in the order named.

Figure 5:
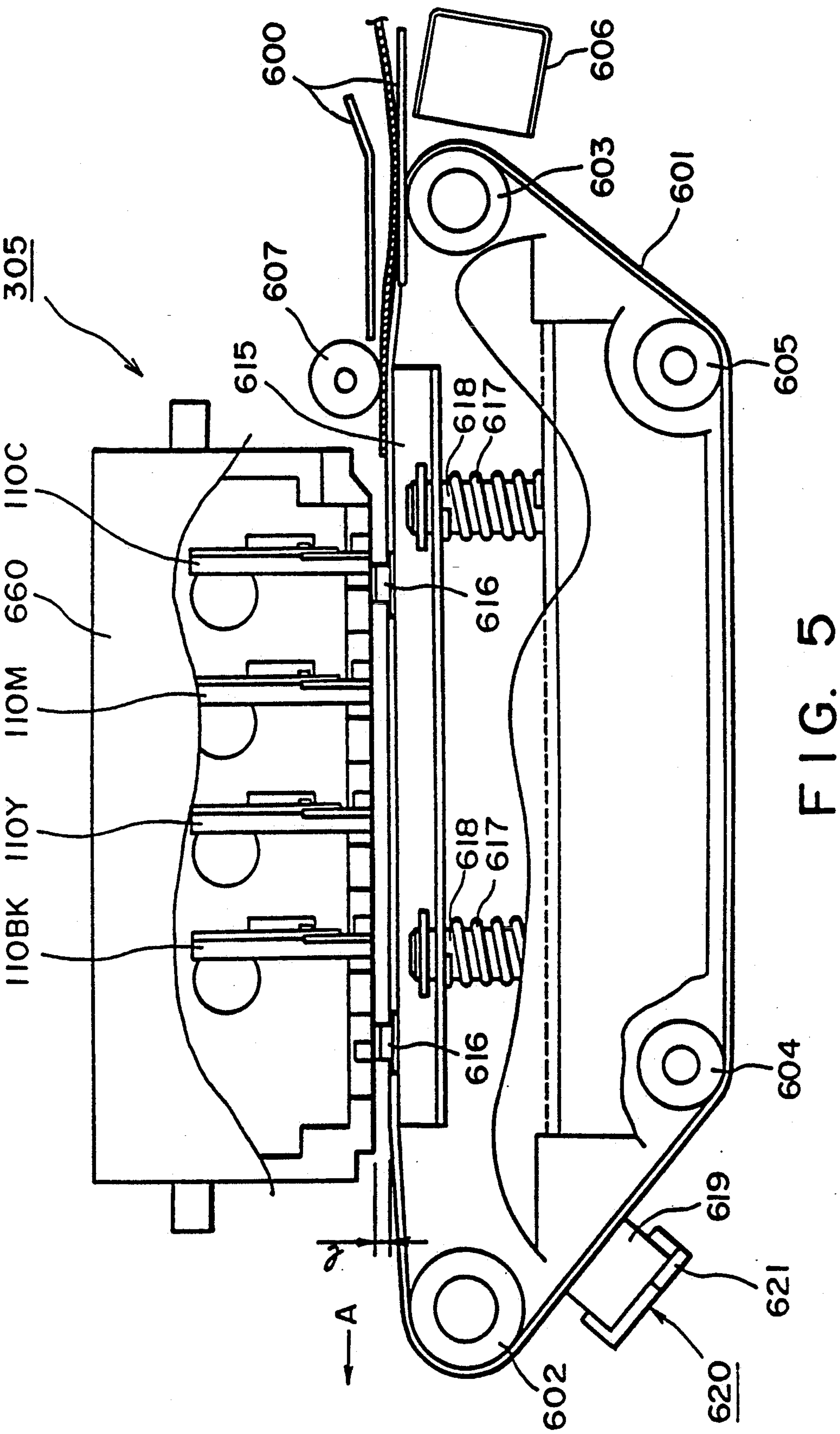
FIG. 5 is a sectional view illustrating a recording head according to an embodiment of the present invention.

The description will be made further with respect to FIG. 5. The recording sheet discharged from registration rollers 415 and 416 is conveyed along the guide plate 600 to the conveyer belt 601. The conveyer belt 601 has a two layer structure including an insulating layer, at the recording paper side, having a volume resistivity of not less than $10^{12}$ ohm.cm, and a conductive layer, at the opposite side, having a volume resistance of not more than $10^{8}$ ohm.cm. The conveyer belt 601 is stretched around the driving roller 602, the follower roller 603 and tension rollers 604 and 605 by a tension force of 2-5 kg. It is moved in the direction A by a motor (not shown) coupled with the driving roller 602. The recording paper is carried on the conveyer belt 601 immediately before the conductive roller 607. At this time, the surface of the conveyer belt 601 is charged by a charger 606 to a potential of from several hundreds to several thousands V. When the recording sheet carried on the conveyer belt 601 reaches a grounded conductive roller 607, an electrostatic attraction force is produced between the recording paper and the conveying belt 601 so that the recording paper is retained closely on the conveyer belt 601. With this state maintained, the transfer material reaches the printing station 608. The printing station comprises a head block 660, printing heads 110C, 110M, 110Y and 110BK, a platen 615, pins 616, a spring 617 and guide pin 618. Here, the clearance between the printing head 110C, 110M, 110Y and 110BK and the printing surface of the recording paper is preferably maintained within 100 microns difference from a predetermined set clearance. Therefore, the platen 615 has a surface flatness of several tens microns at its surface contactable to the conveyer belt 601 so that the conveyer belt 601 constitute a flat surface at the printing station 608. The printing head 110C, 110M, 110Y and 110BK are precisely positioned by the head block 660 so that the surface flatness of the surface constituting all of the orifice surfaces of the heads is approximately several tens microns. The platen 615 is provided with pins 616 for the positioning. When the platen 615 is upwardly urged toward the head block 660 by the spring force of the spring 617 along the guide pin 618, the top of the pin 616 abuts the head block 660, by which a clearance 1 for permitting passage of the recording paper is provided. When the recording paper is conveyed in such a structure, the clearance accuracy between the printing surface of the recording paper at the printing station 608 and the orifice surfaces of the heads is maintained within 100 microns with respect to a predetermined set clearance, since the recording paper is closely contacted on the conveyer belt 601 by the electrostatic force.

Next, the recording paper passes through the printing station 608, by which respective color images are printed thereon by the printing heads 110C, 110M, 110Y and 110BK. If the variation in the speed of the conveyer belt 601 is large, the printing position by the respective heads are deviated with the result of color deviation or non-uniform color images. In order to prevent this, the accuracy of the thickness of the conveyer belt 601, eccentricity of the driving roller 602, rotational accuracy of the driving motor or the like are determined so that the speed variation of the conveyer belt 601 is sufficiently small.

The transfer material having been subjected to the printing operation at the printing station 608, reaches the driving roller 602 while being retained on the conveyer belt 601, and is separated from the conveyer belt 601 by the curvature thereof, and then is conveyed to an image fixing station.

Thereafter, the surface of the conveyer belt 601 is cleaned by a cleaner 620 having an ink absorbing material 619. The ink absorbing material 619 is made of continuous porous material such as polyvinyl formal resin or the like. The absorbed ink flows externally through an outlet 62 and is collected.

Figure 11:
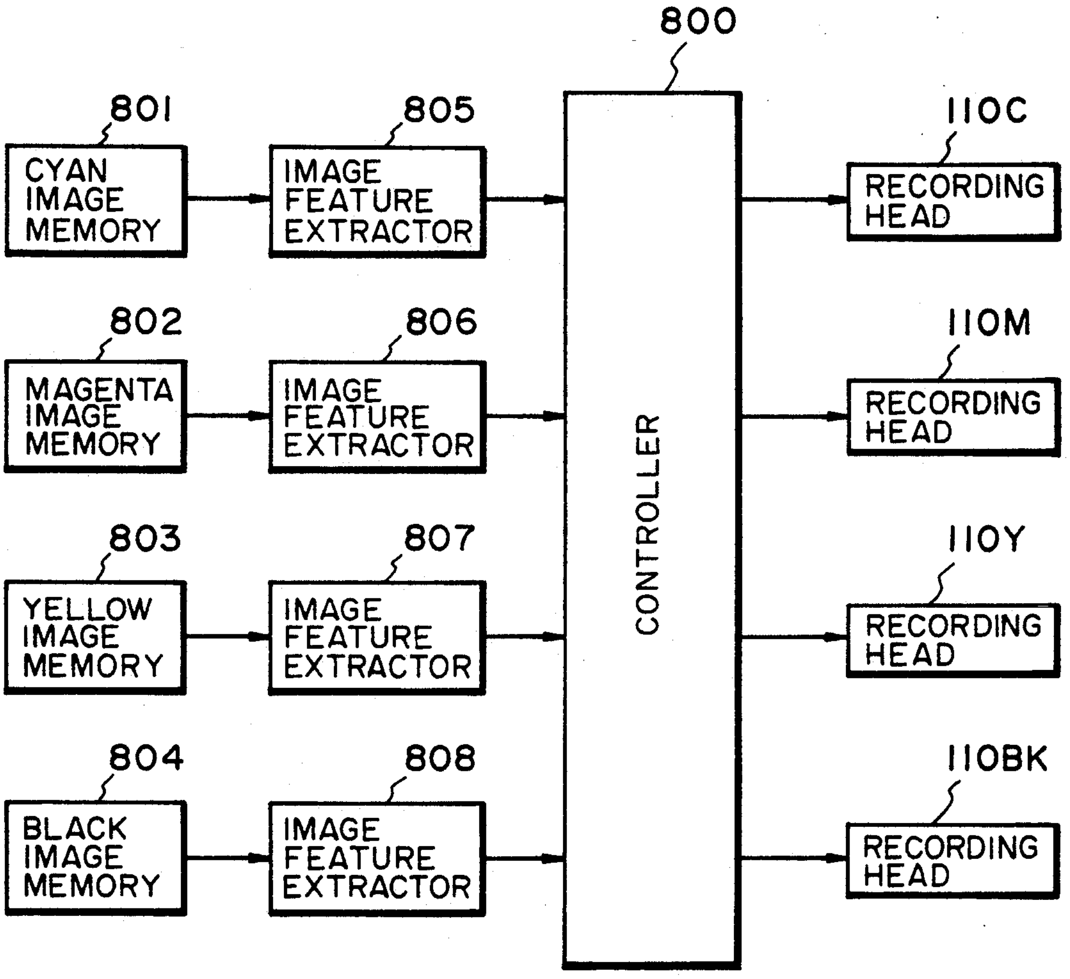
FIG. 11 shows a control system for an ink jet recording apparatus according to an embodiment of the present invention.
Figure 12A:
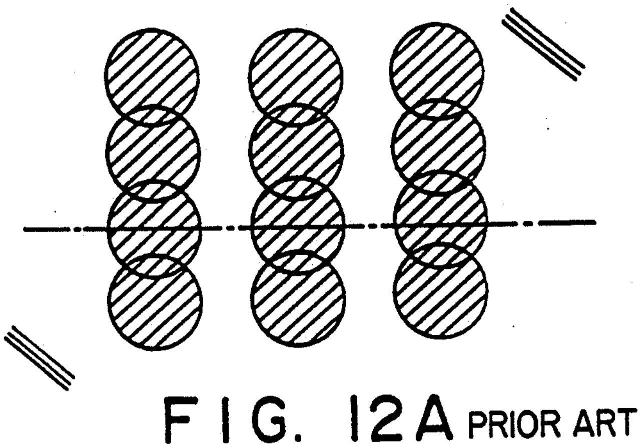
FIG. 12A PRIOR ART
FIGS. 12A, 12B, 13A and 13B are top plan views and sectionals views of a print, illustrating the blurness occurring in a conventional apparatus.
Figure 12B:
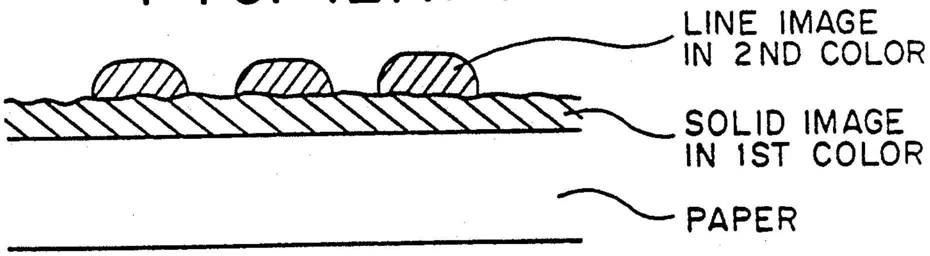
FIG. 12B PRIOR ART
Figure 13A:
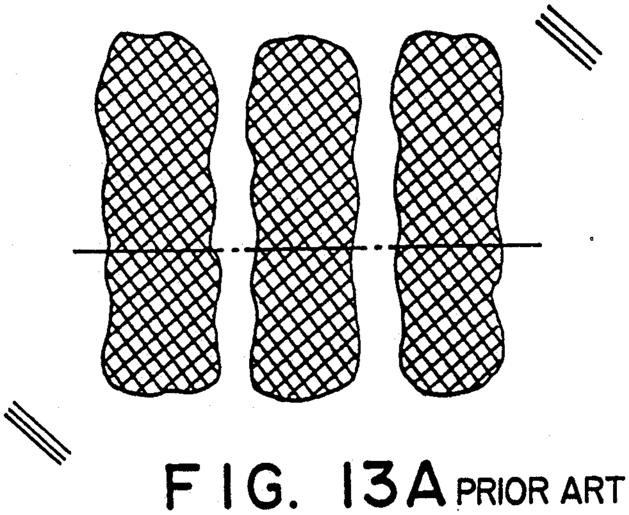
FIG. 13A PRIOR ART
Figure 13B:
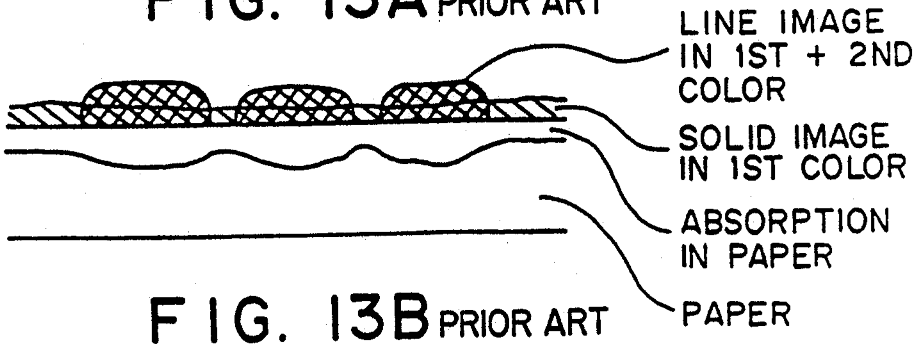
FIG. 13B PRIOR ART
Figure 14:
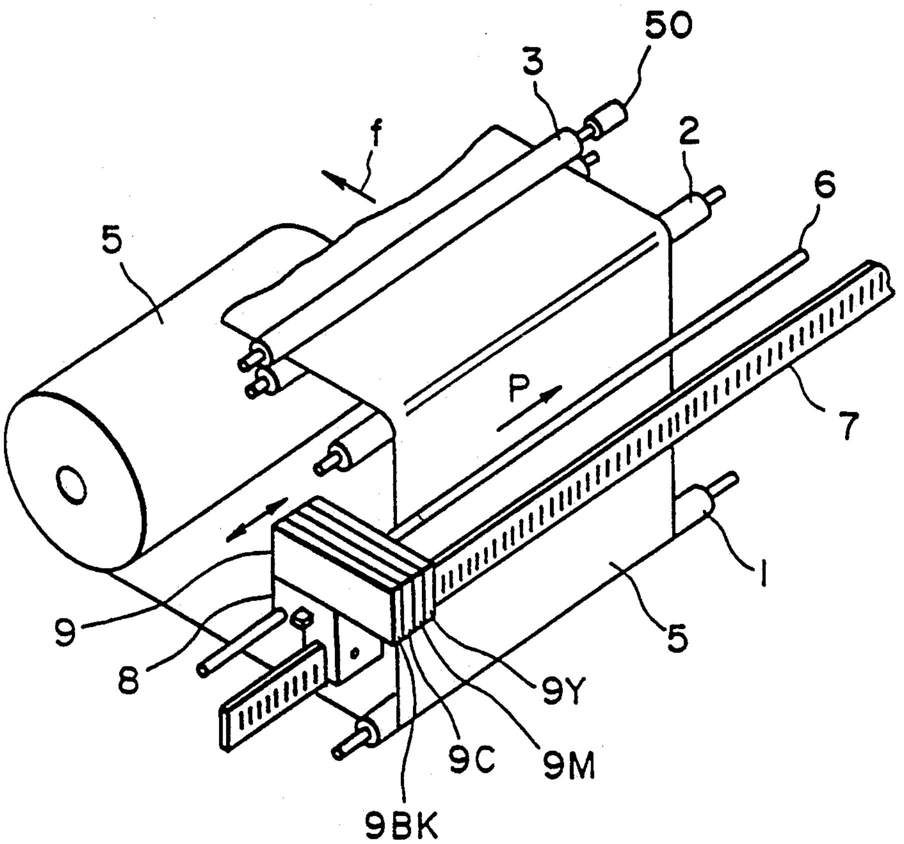
FIG. 14 PRIOR ART
FIG. 14 is a perspective view of a part of a conventional ink jet recording apparatus.

FIG. 11 is a block diagram of a control system for the ink jet recording apparatus of this embodiment. The control system comprises a control circuit 800 including a microcomputer, memory means 801–804 for storing image data covering one page of each of cyan, magenta, yellow and black image components, and image feature extractors 805, 806, 807 and 808 for discriminating whether a part of the image around a noted image portion in the one page image data stored in each of the memory means 801–804 is a high density solid image or an edge image. The image feature extractors 805–808 supply the results of discrimination to the control circuit 800.

Figure 2:
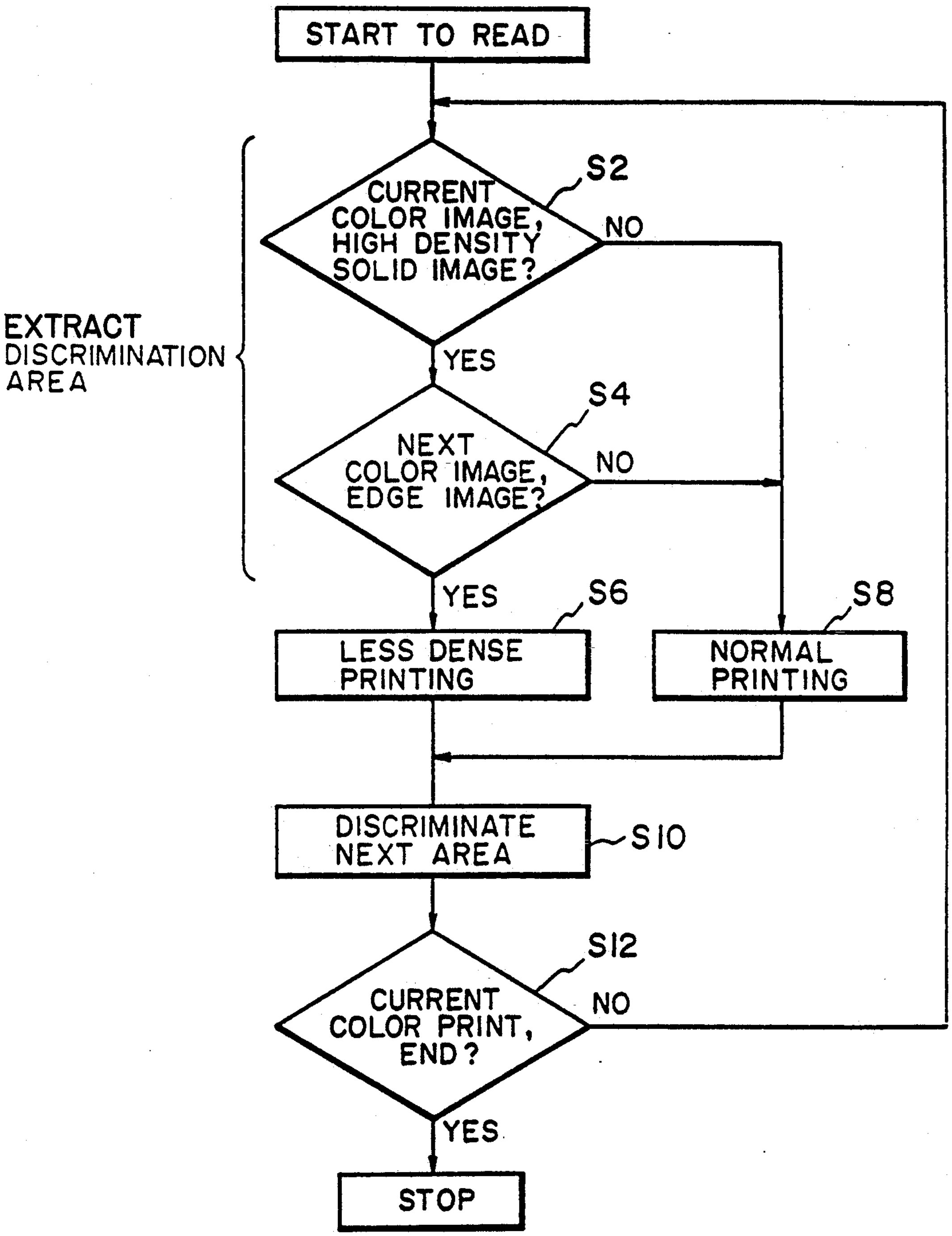
FIG. 2 is a flow chart illustrating the algorithm of the ink jet recording apparatus according to a first embodiment of the present invention.

FIG. 2 is a flow chart showing the operation of the control in this embodiment. In this embodiment, in the case where it is discriminated that on a high density solid image portion, a line image having an edge is printed in a different color, the quantity of the liquid for the high density image is reduced at the position corresponding to the edge. The image data for one original page read by an unshown reading station are separated into cyan, magenta, yellow and black color components and are stored in the memory means 801–804.

The control circuit 800 discriminates whether the color component image is solid image or not (S2) in a predetermined region about a noted image portion. If it is not the solid image, the normal printing operation is performed in the color (S8). If it is the solid image, the discrimination is made as to whether or not the subsequent image or images have an edge or edges (S4). If not, the step S8 is executed, by which the normal printing operation is carried out. If there is an edge, the low quantity (density) printing is executed S6.

Then, the operation proceeds to the next region about the next noted image portion, and the above-operation is repeated until the entire region is covered (S10, S12).

The control is effected to the cyan, magenta, yellow heads with the delay of time corresponding to the time required for the movement between the heads.

Figure 3A:
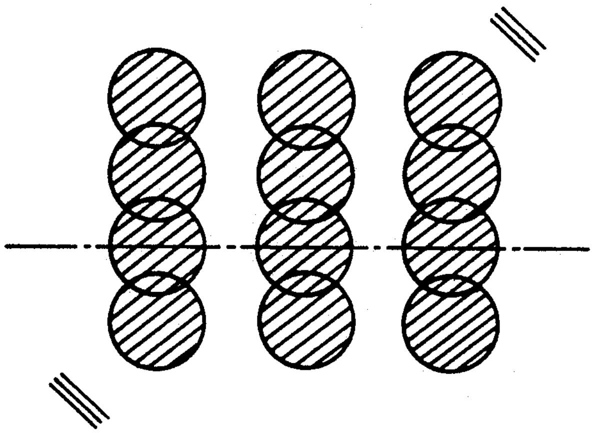
FIGS. 3A, 3B, 4A and 4B are top plan views or sectional views of a print illustrating the improved line image.
Figure 3B:
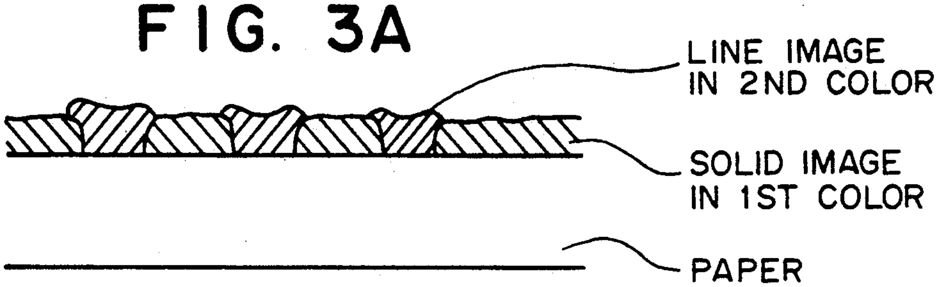
Figure 4A:
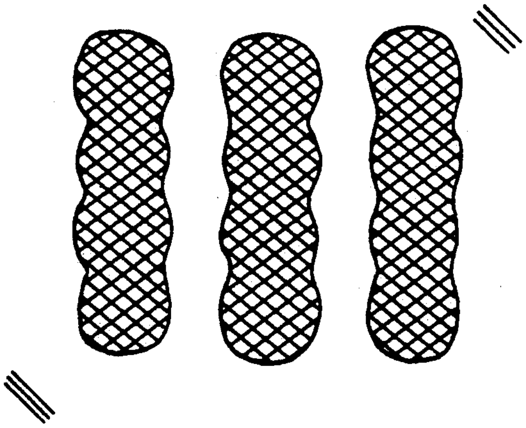
Figure 4B:
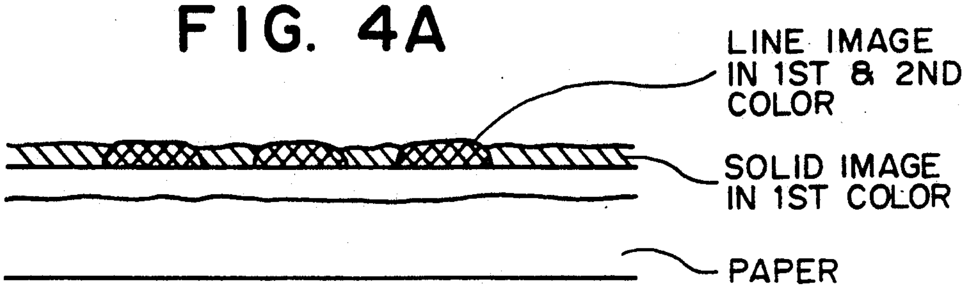

In FIGS. 3A and 3B, the overlapping of the ink layers when the high density solid image (background of the line image and having the second color) is printed at low density. As will be understood, both of the first color ink and the second color ink are evaporated and absorbed into the paper. FIGS. 4A and 4B show the mixed state of the second color ink and the first color ink. However, the ink at the edge of the line image does not overflow, and therefore, the edge is not blurred. As to how far of the peripheral of the edge is extracted from the line image, and/or as to what degree the density of the solid image there is decreased, one ordinary skilled in the art can determine the optimum in consideration of the ink drying speed, the time period until the next color ink is printed, the ink absorbing speed of the recording paper or the like.

This embodiment is particularly effective when the ink absorption into the recording material is small as in the case of an OHP (overhead projector) recording material and when the drying speed of the ink in the first ink layer is relatively long.

In the foregoing embodiment, the line image is printed on a high density solid image, but the present invention is applicable where the solid image and a line image are overlaid, and therefore, it is effective when the solid image is printed on a line image.

Embodiment 2

First embodiment, in the case where after a high image density solid image is printed, a line image is printed, the number of print dots for the high image density solid image is reduced in the high density solid image portion, by which the quantity of the ink is reduced. In the second embodiment, the quantity of the printing ink is reduced by reducing the size of the dot in the high density solid image portion in the extracted area.

Figure 6:
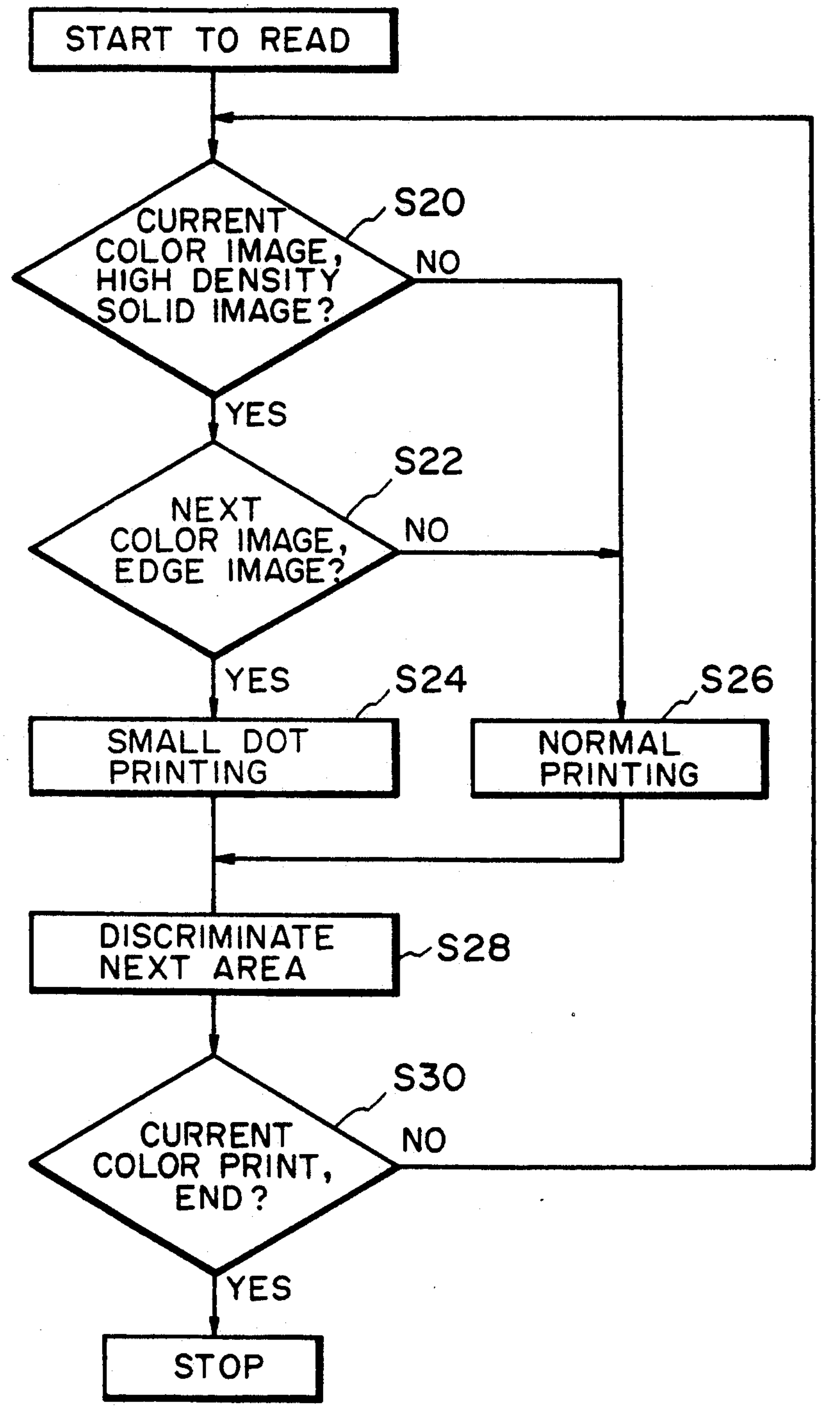
FIG. 6 is a flow chart showing an algorithm of the apparatus according to a second embodiment of the present invention.

FIG. 6 shows the algorithm thereof. As a means for printing with the smaller dot only in the extracted region is, for example, means for reducing the electric energy supplied to the electrothermal transducer of the ink jet recording head shown in FIG. 9. By doing so, finer quantity control than the number of dots reducing process becomes possible, so that an optimum image can be provided easily.

Embodiment 3

Figure 7:
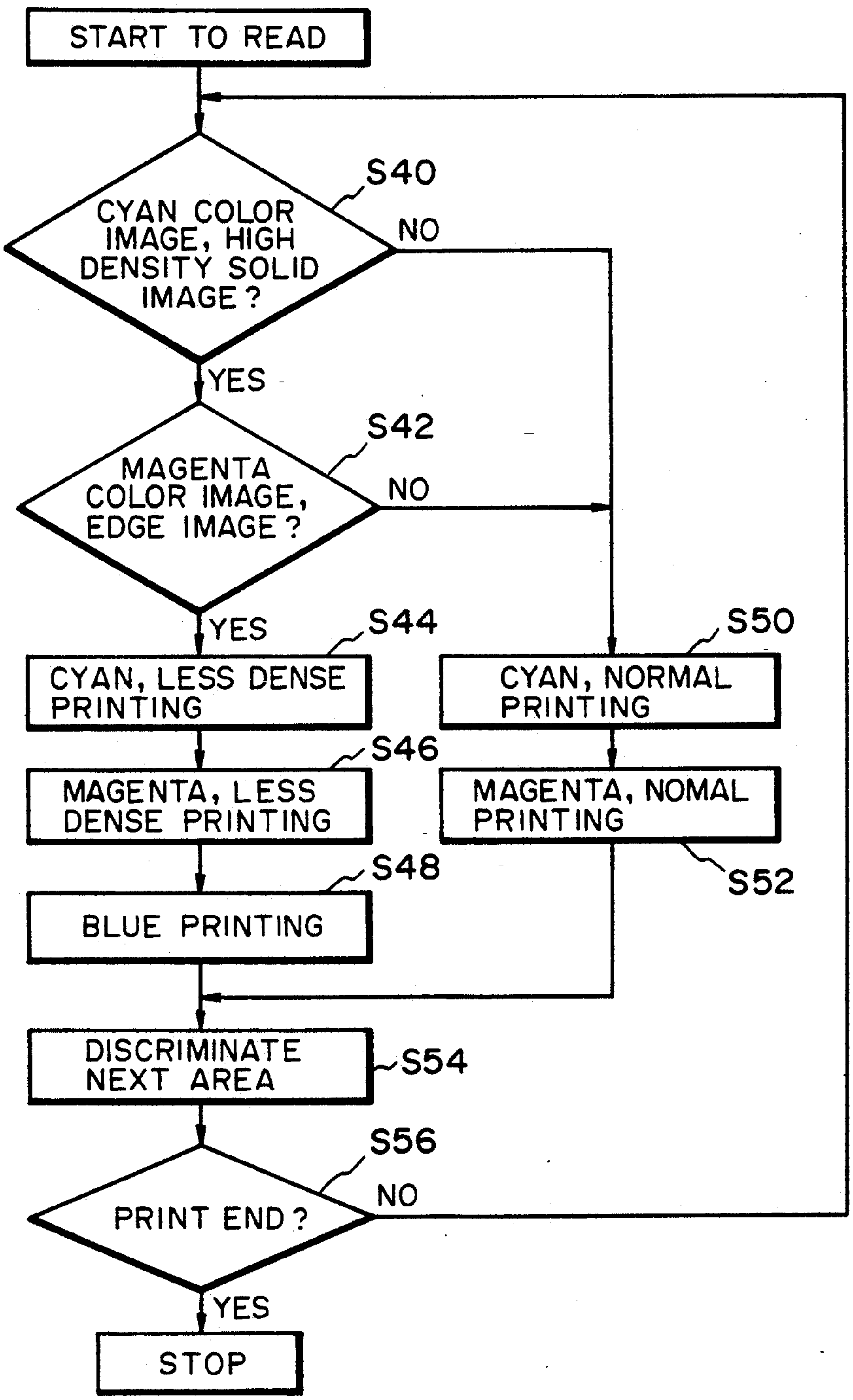
FIG. 7 is a flow chart showing an algorithm of the apparatus according to a third embodiment of the present invention.
Figure 10:
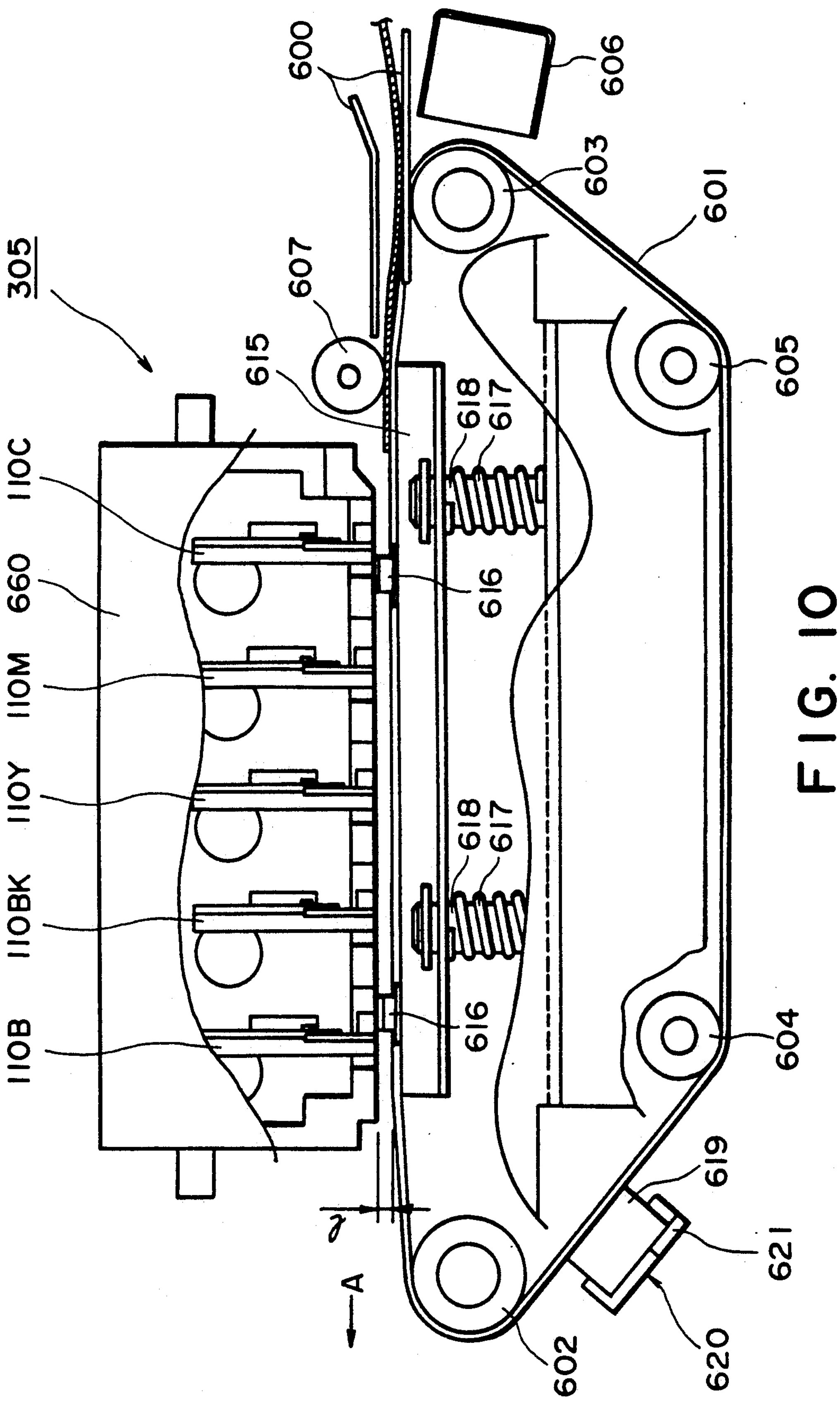
FIG. 10 is a sectional view of a recording head of an ink jet recording apparatus according to a third embodiment of the present invention.

As shown in FIG. 10, in the third embodiment, there is provided a head 110B containing a second color image (blue provided by the mixture of the cyan and the magenta, in this embodiment). As shown in FIG. 7, if the discrimination is made that cyan is in the high density solid portion, and magenta is in the edge portion, both of the quantities of the cyan ink and magenta ink are reduced, and the blue printing is effected.

Thus, in place of overlaying to color inks, the second color ink is used, by which the quantity of the ink per unit area can be reduced down to one half. In this manner, the edge of the second color line image is not blurred, and the printed color in the second color is stabilized.

As described in the foregoing, an image having an edge and a high density image are mixed, the blurness of an edge of a line image where the colors are mixed can be prevented by reducing the quantity of the ink printed in the high density image at the position corresponding to the edge or the periphery of the edge.

While the invention has been described with reference to the structures disclosed herein, it is not confined to the details set forth and this application is intended to cover such modifications or changes as may come within the purposes of the improvements or the scope of the following claims.

What is claimed is:

1. A color ink jet recording apparatus for forming an image on a recording material by ejection of coloring agents having different colors form a recording head, said apparatus comprising:

discriminating means for discriminating whether an image having an edge and an image having a high image density are to be overlaid or not overlaid and for outputting a result of the discrimination; and exchanging means for exchanging a primary coloring agent recording operation with a secondary coloring agent recording operation when the result of the discrimination by said discriminating means is affirmative.

2. An apparatus according to claim 1, wherein said recording head comprising plural ejection outlets and plural energy generating elements corresponding to respective ejection outlets, said energy generating elements for causing sufficient changes of state of the coloring agents as to eject the coloring agents through the ejection outlets.

3. An apparatus according to claim 2, wherein said energy generating elements generate thermal energy.

* * * * *

UNITED STATES PATENT AND TRADEMARK OFFICE

CERTIFICATE OF CORRECTION

PATENT NO. : 5,252,992 Page 1 of 2

DATED : October 12, 1993

INVENTOR(S) : Hisashi FUKUSHIMA, et al.

It is certified that error appears in the above-indentified patent and that said Letters Patent is hereby corrected as shown below:

Title Page:

AT [73] ASSIGNEE:

"Canon Kaubushiki Kaisha" should read --Canon Kabushiki Kaisha--.

COLUMN 1:

Line 54, "is" should read --are--.

COLUMN 2:

Line 50, "sectionals" should read --sectional--; and "blurness" should read --blurriness--.

COLUMN 3:

Line 24, "read" should read --read information--.

COLUMN 4:

Line 45, "container 5" should read --container 55--;

Line 64, "is" should read --are--.

COLUMN 5:

Line 48, "head" should read --heads--;

Line 56, "head" should read --heads--.

UNITED STATES PATENT AND TRADEMARK OFFICE

CERTIFICATE OF CORRECTION

PATENT NO. : 5,252,992 Page 2 of 2

DATED : October 12, 1993

INVENTOR(S) : Hisashi FUKUSHIMA, et al.

It is certified that error appears in the above-indentified patent and that said Letters Patent is hereby corrected as shown below:

COLUMN 7:

Line 12, "ordinary" should read --ordinarily--;
Line 29, "First embodiment," should read --In the first embodiment,--;
Line 35, "dot" should read --dots--;
Line 39, "dot" should read --dots--.

COLUMN 8:

Line 1, "image" should read --ink--;
Line 7, "to" should read --two--;
Line 14, "blurness" should read --blurriness--;
Line 28, "form" should read --from--;
Line 40, "comprising" should read --comprises--.

Signed and Sealed this

Nineteenth Day of July, 1994

Attest:

Bruce Lehman

BRUCE LEHMAN

*Attesting Officer* *Commissioner of Patents and Trademarks*